United States Patent
Kaneko (10) Patent No.: US 11,360,266 B2
(45) Date of Patent: Jun. 14, 2022

(54) METHOD FOR MANUFACTURING OPTICAL MULTIPLEXER/DEMULTIPLEXER

(71) Applicant: Mitsubishi Electric Corporation, Tokyo (JP)

(72) Inventor: Shinichi Kaneko, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 87 days.

(21) Appl. No.: 16/769,212

(22) PCT Filed: Feb. 9, 2018

(86) PCT No.: PCT/JP2018/004631
§ 371 (c)(1),
(2) Date: Jun. 2, 2020

(87) PCT Pub. No.: WO2019/155609
PCT Pub. Date: Aug. 15, 2019

(65) Prior Publication Data
US 2021/0173147 A1    Jun. 10, 2021

(51) Int. Cl.
*H04J 14/02* (2006.01)
*G02B 6/293* (2006.01)

(52) U.S. Cl.
CPC .................. *G02B 6/2938* (2013.01)

(58) Field of Classification Search
CPC ........ G02B 6/2938; G02B 6/26; G02B 27/00; G02B 27/10; G02B 27/14; G02B 5/08; G02B 6/29367; G02B 6/4215; G02B 7/182; H04J 14/02; H04J 14/00; H04B 10/572; H04B 10/501

USPC ................ 398/79, 82, 85, 88, 68; 156/275.5
See application file for complete search history.

(56) References Cited

U.S. PATENT DOCUMENTS

| | | |
|---|---|---|
| 2008/0013886 A1 | 1/2008 | Morris et al. |
| 2009/0103866 A1 | 4/2009 | Morris et al. |
| 2011/0033152 A1 | 2/2011 | Morris et al. |
| 2014/0133862 A1 | 5/2014 | Fujimura et al. |
| 2019/0331837 A1* | 10/2019 | Wheatley ............. G02B 5/0841 |

FOREIGN PATENT DOCUMENTS

| | | | |
|---|---|---|---|
| JP | S63223607 | * 9/1988 | ............. G02B 6/293 |
| JP | S63223607 A | 9/1988 | |
| JP | 2007163631 A | 6/2007 | |

(Continued)

OTHER PUBLICATIONS

International Search Report issued in PCT/JP2018/004631; dated Apr. 10, 2018.

*Primary Examiner* — Hibret A Woldekidan
(74) *Attorney, Agent, or Firm* — Studebaker & Brackett PC (57) ABSTRACT

A method of manufacturing an optical multiplexer/demultiplexer includes the steps of: detachably holding optical filters and a mirror respectively to one surface and to the other surface of a pair of mutually parallel surfaces of gripping jigs; gripping a block holder between the gripping jigs with interposition of adhesive layers so as to reflect the parallelism of the pair of the surfaces; heating the gripping jigs gripping the block holder; and cooling the gripping jigs with them gripping the block holder. The optical filters and the mirror are thereby bonded to the block holder in parallel to each other.

20 Claims, 9 Drawing Sheets

(56) References Cited

FOREIGN PATENT DOCUMENTS

| | | |
|---|---|---|
| JP | 2009503567 A | 1/2009 |
| JP | 2014095843 A | 5/2014 |
| JP | 2015138237 A | 7/2015 |
| JP | 2017529552 A | 10/2017 |
| WO | 2017033230 A1 | 3/2017 |
| WO | WO-2017033230 A1 * 3/2017 | ............. G02B 27/10 |

* cited by examiner

METHOD FOR MANUFACTURING OPTICAL MULTIPLEXER/DEMULTIPLEXER

TECHNICAL FIELD

The present application relates to a method of manufacturing an optical multiplexer/demultiplexer for multiplexing or demultiplexing a plurality of optical signals of different wavelengths.

BACKGROUND ARTS

Recent years have seen rapid increase in communication capacity. To cope with such a situation, optical transmission systems widely employ wavelength division multiplexing optical transmission, in which optical signals of multiple wavelengths are multiplexed onto a single optical fiber to transmit and receive. In the optical wavelength division multiplexing transmission, the optical multiplexer/demultiplexer is an optical component for multiplexing a plurality different wavelength optical signals onto a single optical fiber or for demultiplexing a plurality of different wavelength optical signals propagating through the single optical fiber into individual wavelength optical signals. Optical multiplexers/demultiplexers are categorized into two types: one is an optical waveguide type that has waveguides designed to have the function of multiplexing/demultiplexing; and the other is a spatial coupling type that achieves the function of multiplexing/demultiplexing by utilizing the wavelength transmission characteristics of optical filters. The optical multiplexer/demultiplexer of spatial coupling type has merits of compactness and low optical loss; hence, it is widely employed in a transceiver for wavelength division multiplexing optical transmission (see, for example, Patent Document 1).

In an optical transmission system, a plurality of optical signal beams having wavelengths $\lambda_i$ (i=0, 1, 2, 3) are respectively emitted from semiconductor lasers, which are signal sources of a wavelength multiplexing optical transmission device, and collimated into parallel beams by lenses, to be incident on an optical multiplexer. A plurality of optical filters of the optical multiplexer/demultiplexer have wavelength transmission characteristics of transmitting the optical signal beams having the respective corresponding wavelengths $\lambda_i$ and of reflecting those having other wavelengths. Hence, the optical signal beams having wavelengths $\lambda_i$ transmit through the respective corresponding optical filters and are incident into a holder block and reflect between a mirror and the optical filters, to emit from the optical multiplexer. In this way, the optical signal beams emitted from the semiconductor lasers are multiplexed by the optical multiplexer and emitted therefrom. The optical signal beams emitted from the optical multiplexer are focused into an optical fiber by a lens and transmitted as a wavelength multiplexed optical signal beam from the optical transmission device.

In this configuration, if the angles of surfaces (two parallel surfaces) of the holder block for bonding the optical filters and the mirror or the angles of bonding the optical filters and the mirror to the holder block are misaligned, the angles of the beams emitted from the optical multiplexer become out of alignment, thus reducing the coupling efficiency between the optical multiplexer and the optical fiber.

PRIOR ART DOCUMENT

Patent Document

Patent Document 1: JP2014-095843A (Paragraphs [0024] to [0028] and FIG. 1).

SUMMARY OF THE INVENTION

Problem that the Invention is to Solve

As described above, a high angular accuracy is required for the holder block and for bonding the optical filters and the mirror to the holder block. For that reason, the holder block needs to have a high accuracy in geometry of the adherend surfaces, thus causing a problem of increasing component cost. Moreover, a conventional optical multiplexer/demultiplexer is manufactured such that the optical filters and the mirror are fixedly bonded one by one to the two high-accuracy parallel surfaces of the holder block by evenly pressed into close contact with the parallel surfaces so as not to cause unevenness of the adhesive, thus posing a problem of mass productivity. Furthermore, in the optical wavelength division multiplexing transmission, there is a demand for increasing the number of multiplexed wavelengths per wavelength band by reducing the wavelength spacing. However, since severe specs are required for the transmission characteristics (center transmission wavelength) of the optical filter, a small manufacturing error causes yield loss, thus raising a problem of increasing component cost of the optical filter.

The present application is made to resolve the above-described problems and aimed at providing a method of manufacturing an optical multiplexer/demultiplexer that relaxes accuracy requirements on assembly and components, and achieves a high mass productivity.

Means for Solving the Problem

A method of manufacturing an optical multiplexer/demultiplexer according to the present application includes the steps of detachably holding optical filters and a mirror to one surface and another surface of gripping jigs; and gripping between the gripping jigs a holder block provided with adhesive layers in positions respectively opposite the optical filters and the mirror with interposition of the adhesive layers so as to reflect parallelism of the pair of surfaces.

Advantage Effect of the Invention

According to the present application, since the degree of parallelism between the optical filters and the mirror is determined by the degree of parallelism of the pair of parallel surfaces of the gripping jigs, a method of manufacturing an optical multiplexer/demultiplexer can be provided that eliminates the need for using a high-accuracy block holder and achieve a high mass productivity.

EMBODIMENTS FOR CARRYING OUT THE INVENTION

Embodiment 1

Figure 1:
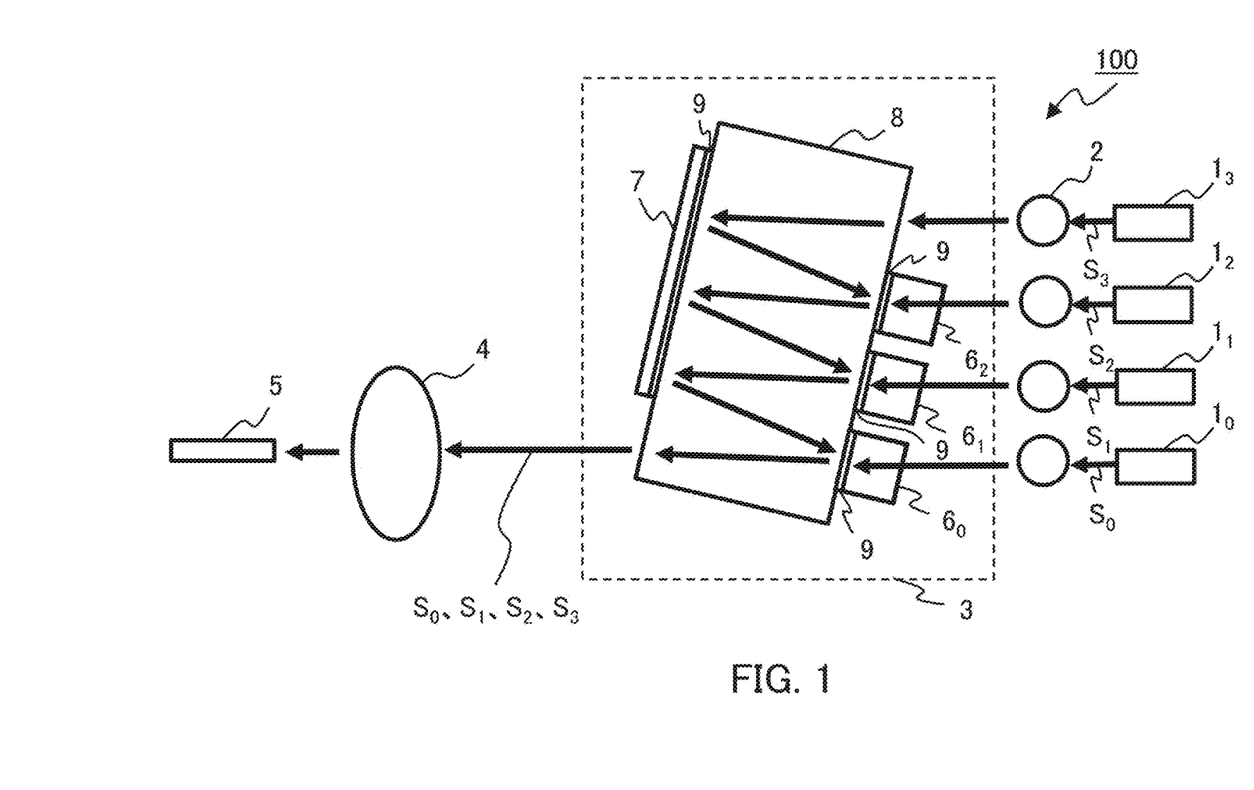
FIG. 1 is a schematic diagram showing a configuration of an optical transmission system including an optical multiplexer/demultiplexer according to Embodiment 1 of the present application.
Figure 2A:
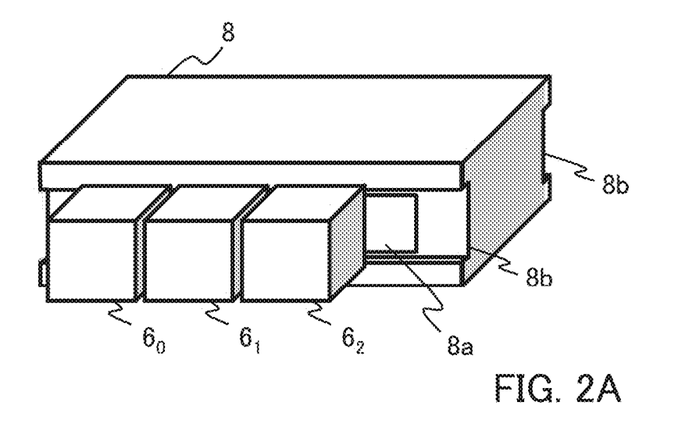
FIGS. 2A to 2B illustrate perspective views showing the configuration of the optical multiplexer/demultiplexer according to Embodiment 1 of the present application.
Figure 2B:
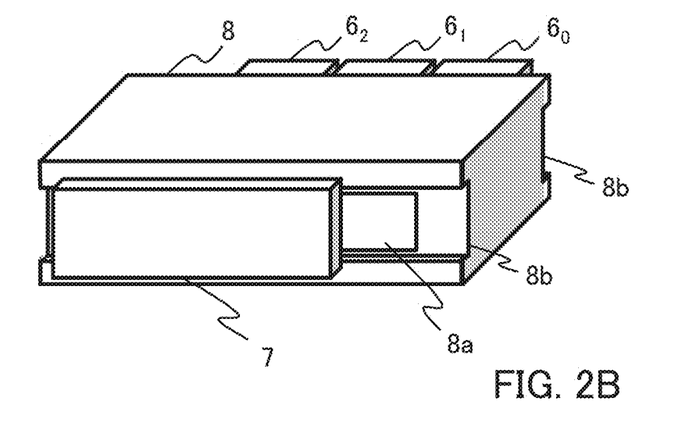

FIG. 1 is a schematic diagram showing a configuration of an optical transmission system 100 that has an optical multiplexer/demultiplexer 3 according to the present application. FIGS. 2A to 2B illustrate perspective views showing the configuration of the optical multiplexer/demultiplexer 3, in which FIG. 2A is a view seeing from a direction toward optical filters $6_j$ bonded to a holder block 8 and FIG. 2B is a view seeing from a direction toward a mirror 7 bonded thereto.

Referring to FIG. 1 the optical transmission system includes semiconductor lasers $1_i$ (i=0, 1, 2, 3) for emitting optical signal beams $S_i$ having wavelengths $\lambda_i$; lenses 2 for collimating the optical signal beams $S_i$ emitted from the semiconductor lasers $1_i$ into parallel beams; the optical multiplexer/demultiplexer 3 for multiplexing the optical signal beams $S_i$ to emit; a lens 4 for focusing the multiplexed and emitted optical signal beams $S_i$; and an optical fiber 5 for transmitting the focused optical signal beams $S_i$. The optical multiplexer/demultiplexer 3 is configured such that the optical filters $6_j$ (j=0, 1, 2, 3) and the mirror 7 are bonded to parallel surfaces of the holder block 8. The optical filters $6_j$ have respective wavelength transmission characteristics of transmitting the optical signal beams having the corresponding wavelengths $\lambda_i$ and of reflecting those having no corresponding wavelengths, whereas the mirror 7 reflects the optical signal beams having all wavelengths. The optical filters $6_j$ and the mirror 7 are fixedly bonded in respective predetermined positions on the two parallel surfaces of the holder block 8 with adhesive layers 9. As shown in FIGS. 2A to 2B the holder block 8 has recesses $8_b$ formed in the middle portions of the two parallel surfaces and has a hollow through space $8_a$ penetrating between the recesses, for passing the optical signal beams.

Figure 3:
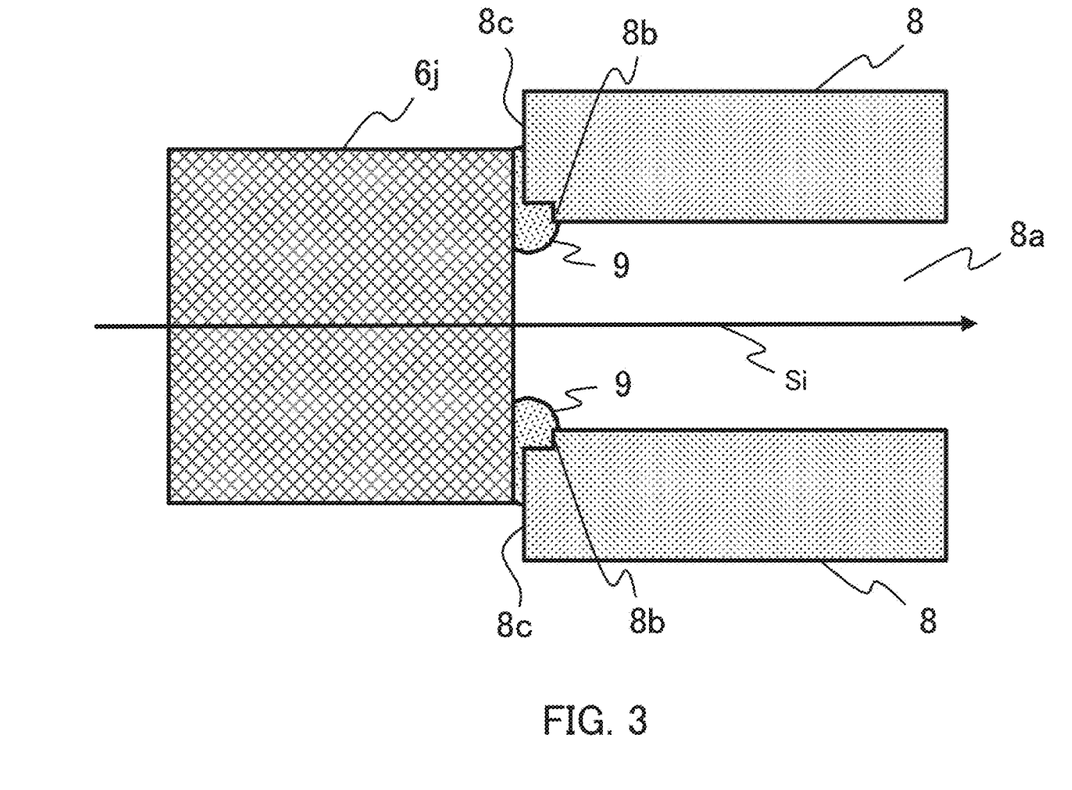
FIG. 3 is a cross section showing a structure for bonding optical filters to a block holder with an adhesive layer, of the optical multiplexer/demultiplexer according to Embodiment 1 of the present application.

FIG. 3 is a cross section showing a structure for bonding the optical filters $6_j$ to the holder block 8 with the adhesive layer 9. As shown in FIG. 3, the optical filters $6_j$ are bonded with the adhesive layer 9 in predetermined positions on one parallel surface $8_c$ of the two parallel surfaces of the holder block 8 so as to straddle one of the recesses $8_b$ and the hollow through space $8_a$. Although not shown, the mirror 7 is also bonded with the adhesive layer 9 in a predetermined position on the other parallel surface $8_d$ of the two parallel surfaces of the holder block 8 so as to straddle the other of the recesses $8_b$ and the hollow through space $8_a$.

It should be noted that the optical multiplexer/demultiplexer 3 operates as either of an optical multiplexer and an demultiplexer, and the configuration of the holder block 8, the optical filters $6_j$, and the mirror 7 for the multiplexer or the demultiplexer and the manufacturing method therefor are entirely the same; hence, the optical multiplexer/demultiplexer is described as an optical multiplexer hereinafter.

In the optical transmission system 100, the optical signal beams $S_i$ having the wavelengths $\lambda_i$ are emitted from the semiconductor lasers $1_i$ (i=0, 1, 2, 3), which are signal sources of the wavelength division multiplexing optical transmission device, and then collimated by lenses 2 to be incident on the optical multiplexer/demultiplexer 3. The optical filters $6_j$ (j=0, 1, 2) of the optical multiplexer/demultiplexer 3 have wavelength transmission characteristics of transmitting the optical signal beams having the corresponding wavelengths $\lambda_i$ and of reflecting those having no corresponding wavelengths. Hence, the optical signal beams having the wavelengths $\lambda_i$ transmit through the respective optical filters $6_j$ and pass through the hollow through space $8_a$ of the holder block 8 and then reflect between the mirror 7 and the optical filters $6_j$, to emit from the optical multiplexer/demultiplexer 3. In this way, the optical signal beams emitted from the semiconductor lasers $1_i$ are multiplexed by the optical multiplexer/demultiplexer 3 and emitted therefrom. The beams emitted from the optical multiplexer/demultiplexer 3 are focused into the optical fiber 5 by the lens 4 and transmitted as a wavelength multiplexed optical signal beam from the optical transmission device.

Figure 4:
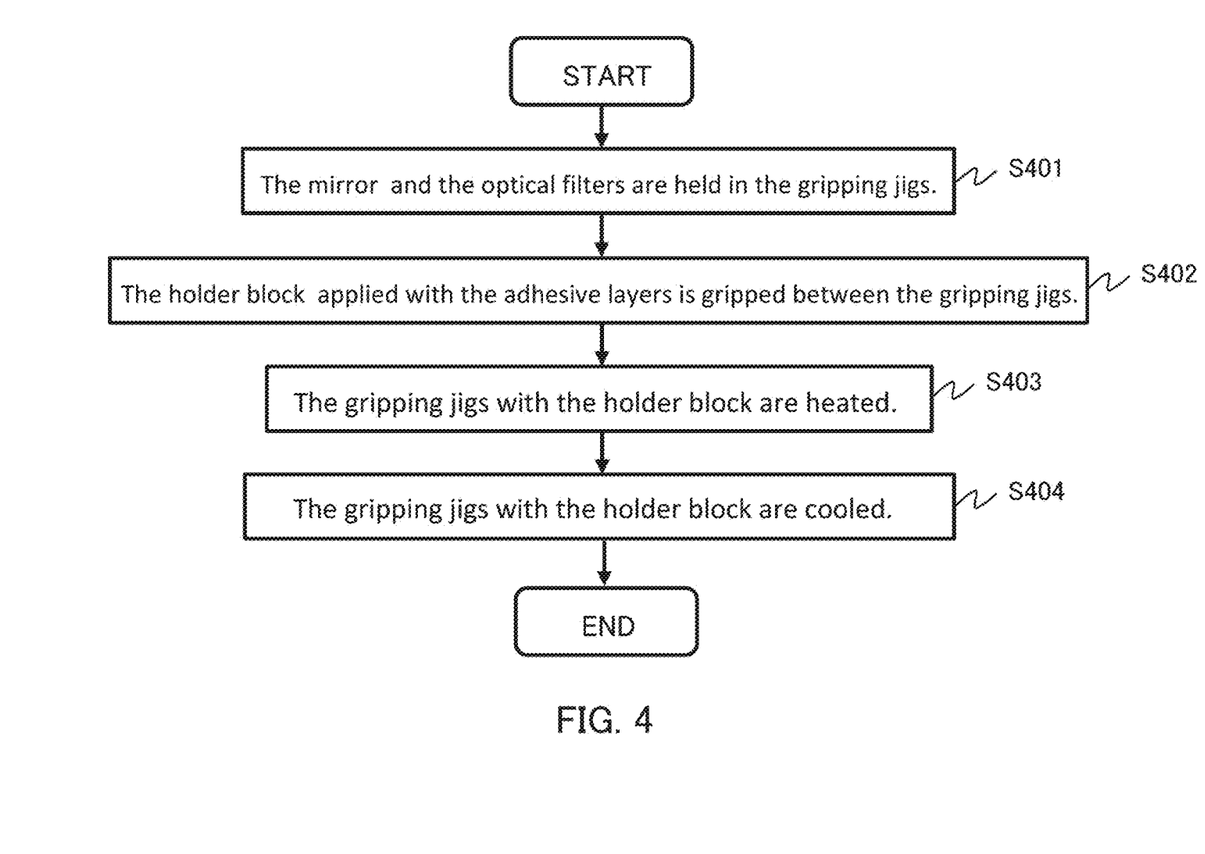
FIG. 4 is a flow diagram showing a process of manufacturing the optical multiplexer/demultiplexer according to Embodiment 1 of the present application.
Figure 5:
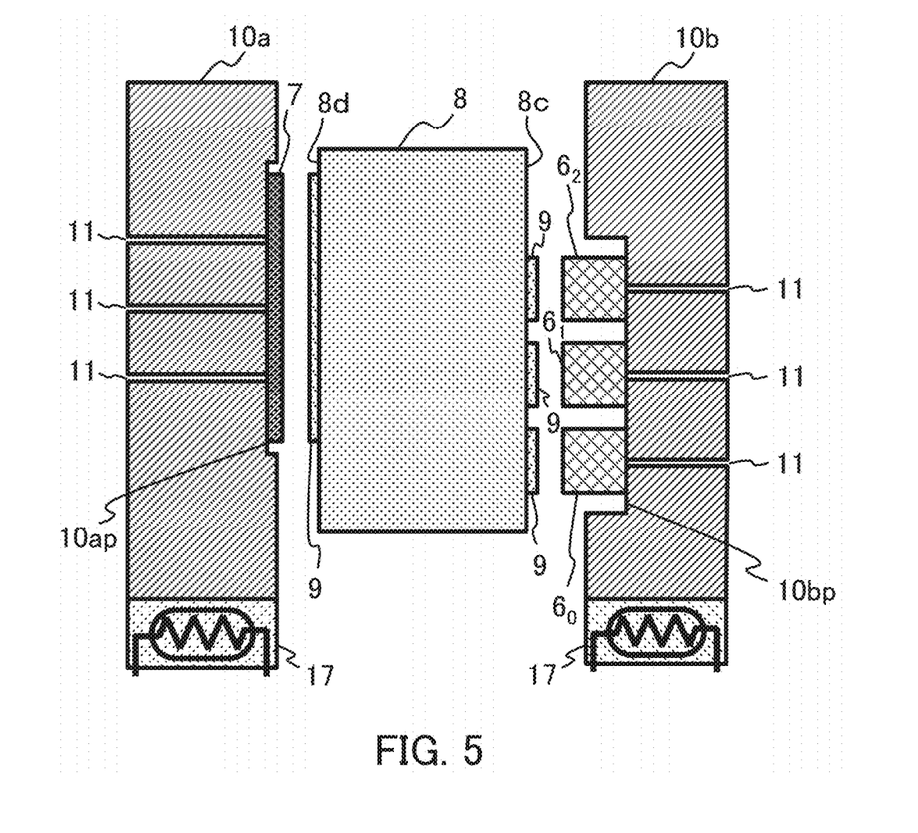
FIG. 5 is a cross section for explaining a method of manufacturing the optical multiplexer/demultiplexer according to Embodiment 1 of the present application.

Next, described is a method of manufacturing the optical multiplexer/demultiplexer 3 according to Embodiment 1 of the present application. FIG. 4 is a flowchart showing a process of manufacturing the optical multiplexer/demultiplexer 3, and FIG. 5 is a cross section for explaining the method of manufacturing the optical multiplexer/demultiplexer 3. In manufacturing the optical multiplexer/demultiplexer 3, used are gripping jigs $10_a$, $10_b$ having a pair of mutually parallel surfaces $10_{ap}$, $10_{bp}$, as shown in FIG. 5. The gripping jigs $10_a$, $10_b$ each are provided with a heater 17 and suction holes 11 for detachably holding the mirror 7 and the optical filters $6_j$ by means of vacuum suction.

Firstly, the mirror 7 and the optical filters $6_0$, $6_1$, $6_2$ are held by vacuum suction through the respective corresponding suction holes 11 formed in the gripping jigs $10_a$, $10_b$, as shown in FIG. 4 (Step S401). At that time, the mirror 7 and the optical filters $6_0$, $6_1$, $6_2$ arranged on the pair of mutually parallel surfaces $10_{ap}$, $10_{bp}$ by the vacuum suction can be maintained in the positional relationship parallel to each other.

Subsequently, the holder block 8 beforehand applied with the adhesive layers 9 in predetermined positions on the parallel surfaces is gripped between the gripping jigs $10_a$, $10_b$ (Step S402). At this time, by the pair of mutually parallel surfaces $10_{ap}$, $10_{bp}$ of the gripping jigs $10_a$, $10_b$, the mirror 7 and the optical filters $6_0$, $6_1$, $6_2$ are pressed onto the parallel surfaces $8_d$, $8_c$ of the holder block 8 with the interposition of the adhesive layers 9, respectively. The adhesive layers 9 are formed of, for example, a thermoplastic adhesive.

Next, the gripping jigs $10_a$, $10_b$ are heated by the heaters 17 provided thereto, with the holder block 8 being gripped between the gripping jigs $10_a$, $10_b$, to melt the adhesive layers 9, which is the thermoplastic adhesive, by applying heat to the holder block 8 through the gripping jigs $10_a$, $10_b$ (Step S403). At this time, the optical filters $6_0$, $6_1$, $6_2$ and the mirror 7 are not pressed with an excess force so as to conform the geometry of the parallel surfaces but pressed with an appropriate force so that the degree of parallelism between the optical filters $6_0$, $6_1$, $6_2$ and the mirror 7 are maintained by the thickness of the adhesive layers 9.

Finally, the gripping jigs $10_a$, $10_b$ are cooled, with the holder block 8 being gripped therebetween (Step S404). The thermoplastic adhesive is cured by cooling the holder block while pressing the optical filters $6_0$, $6_1$, $6_2$ and the mirror 7 onto the holder block 8, whereby the optical filters $6_0$, $6_1$, $6_2$ and the mirror 7 can be fixedly bonded with the adhesive layers 9 to the holder block, with them maintaining the degree of parallelism of the pair of mutually parallel surfaces $10_{ap}$, $10_{bp}$ of the gripping jigs $10_a$, $10_b$.

Since the optical filters $6_0$, $6_1$, $6_2$ and the mirror 7 are bonded to the block holder 8 so as to reflect the parallelism of the pair of mutually parallel surfaces $10_{ap}$, $10_{bp}$ of the gripping jigs $10_a$, $10_b$, the gaps between the parallel surfaces $8_c$, $8_d$ of the block holder 8 and the optical filters and the mirror are filled with the adhesive layers 9. As a result, the gaps are adjusted by the thicknesses of the adhesive layers 9. Accordingly, the adhesive layers 9 are thickly applied beforehand.

When the thickly applied thermoplastic adhesive, which is the adhesive layers 9, is melted with the optical filters $6_0$, $6_1$, $6_2$ and the mirror 7 being pressed onto the holder block 8, an excess of the thermoplastic adhesive is squeezed out of the adherend surfaces. Hence, the recesses $8_b$ are formed, as a relief structure for the thermoplastic adhesive, in the adherend surfaces, i.e., the parallel surfaces $8_c$, $8_d$ of the holder block 8 so that the adhesive is not squeezed out to the optically effective surfaces of the optical filters $6_0$, $6_1$, $6_2$ and the mirror 7 (see FIGS. 2 and 3). Moreover, since the holder block 8 has the hollow through space formed in the portion for passing the signal beams, even the thickly applied adhesive layers 9 causes no increase in optical loss.

Furthermore, in the method of manufacturing the optical multiplexer/demultiplexer, heating and cooling the gripping jigs 10 in accordance with an increasing/decreasing rate of temperature of the holder block 8 more evens out the temperature and softness of the thermoplastic adhesive, thus being able to reduce variations in angles of the optical filters and the mirror during the pressing.

As described above, the method of manufacturing the optical multiplexer/demultiplexer 3 according to Embodiment 1 includes the step of detachably holding the optical filters $6_j$ and the mirror 7 to the one surface $10_{bp}$ of and the other surface $10_{ap}$ of the pair of mutually parallel planes of the gripping jigs $10_a$, $10_b$, respectively; a step of gripping, between the gripping jigs $10_a$, $10_b$ so as to reflect the parallelism of the pair of the surfaces $10_{ap}$, $10_{bp}$, the holder block 8 with the interposition of the adhesive layers 9 applied in the positions respectively opposite the optical filters 6; and the mirror 7; a step of heating the gripping jigs $10_a$, $10_b$ gripping the holder block 8; and a step of cooling the gripping jigs $10_a$, $10_b$, with the holder block 8 being gripped. Thus, the degree of parallelism between the optical filters and the mirror is determined not by the degree of parallelism of the adherend surfaces of the holder block but by the degree of parallelism of the pair of mutually parallel surfaces of the gripping jigs. This eliminates the need for using a high-accuracy holder block; hence, component costs can be reduced. Moreover, since all optical filters and the mirror can be bonded to the holder block, with them being held by the gripping jigs, the manufacturing method exhibits excellent mass productivity. Furthermore, since the holder block has the hollow through space formed in the portion for passing the optical signal beams, even if the adhesive is thickly applied, optical loss of the optical multiplexer/demultiplexer does not increase. Furthermore, since the holder block is formed to have the relief structure in the adherend surfaces for bonding the optical filters and the mirror, even if the adhesive is squeezed out to the optically effective surfaces of the optical filters and the mirror, optical loss does not increase.

In addition, while the above implementation example exemplifies use of a thermoplastic adhesive as the adhesive layers, an ultraviolet curable adhesive may be used. In that case, the adhesive layers are not heated but irradiated with ultraviolet light to cure.

Figure 6:
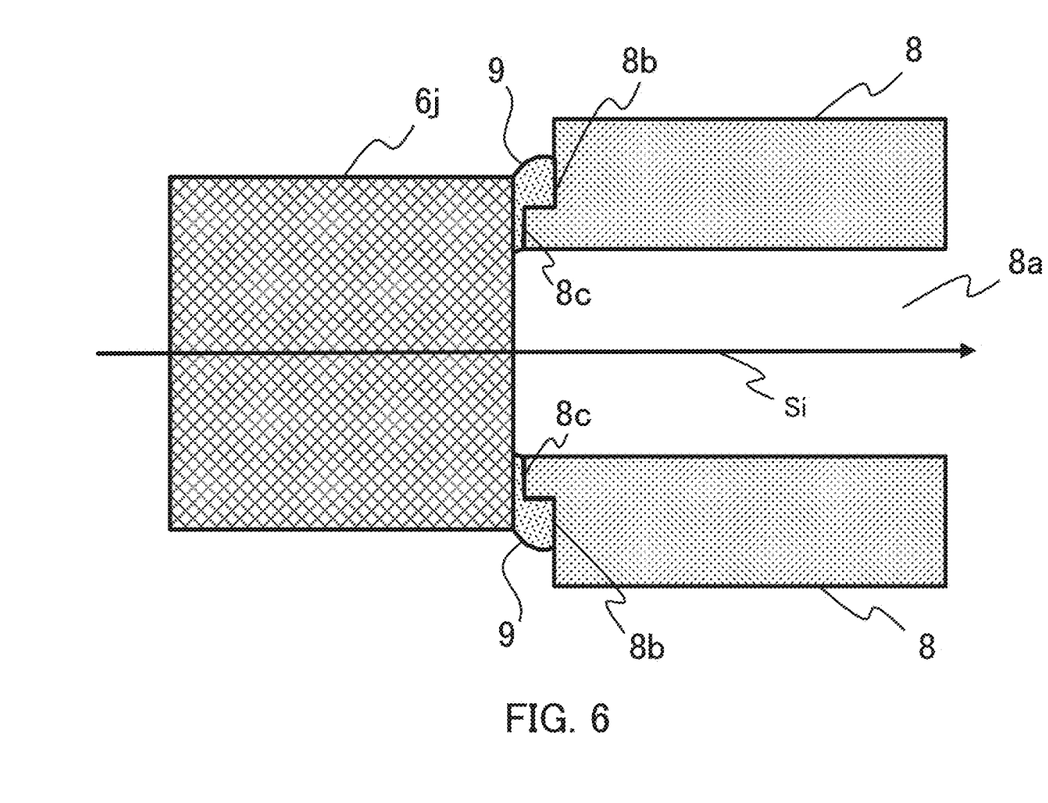
FIG. 6 is a cross section showing another structure for bonding the optical filters to the holder block with the adhesive layer, of the optical multiplexer/demultiplexer according to Embodiment 1 of the present application.

While in the above implementation example, the recesses are formed as the relief structure, which also serve as accumulation spaces for the adhesive, in the middle portions of the two parallel surfaces of the holder block 8, forming such recesses, as shown in FIG. 6, in the outer side of the two parallel surfaces of the holder block 8 also brings about the same effect.

Figure 7:
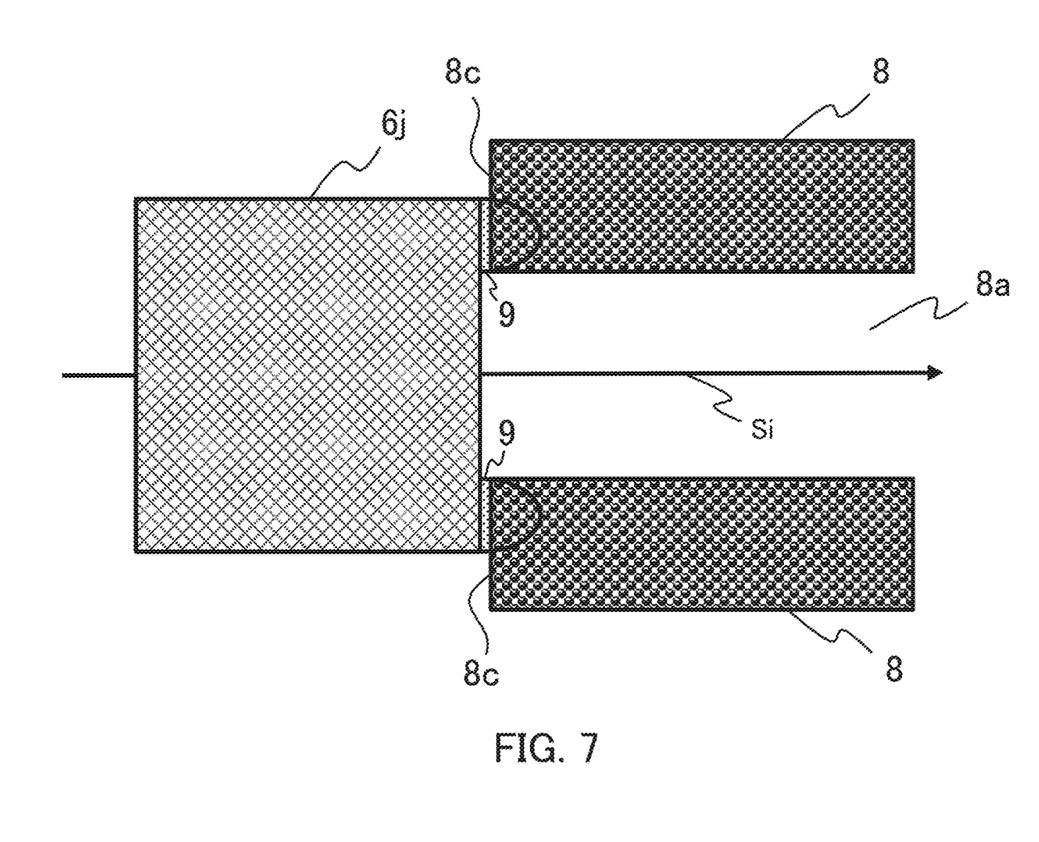
FIG. 7 is a cross section showing still another structure for bonding the optical filters to the holder block with the adhesive layer, of the optical multiplexer/demultiplexer according to Embodiment 1 of the present application.

The holder block 8 may be formed of a porous material so that the holder block itself serves as a relief structure for the adhesive, as shown in FIG. 7. In this case, an excess of the adhesive permeates into the porous holder block, whereby the adhesive can be prevented from seeping out to the optically effective surfaces of the optical filters and the mirror.

Embodiment 2

While Embodiment 1 describes the case of determining the degree of parallelism between the optical filters $6_j$ and the mirror 7 by reflecting the parallelism of the pair of mutually parallel surfaces $10_{ap}$, $10_{bp}$ of the gripping jigs $10_a$, $10_b$, Embodiment 2 further describes a case of adjusting the angles of the optical filters $6_j$ and the mirror 7.

Figure 8:
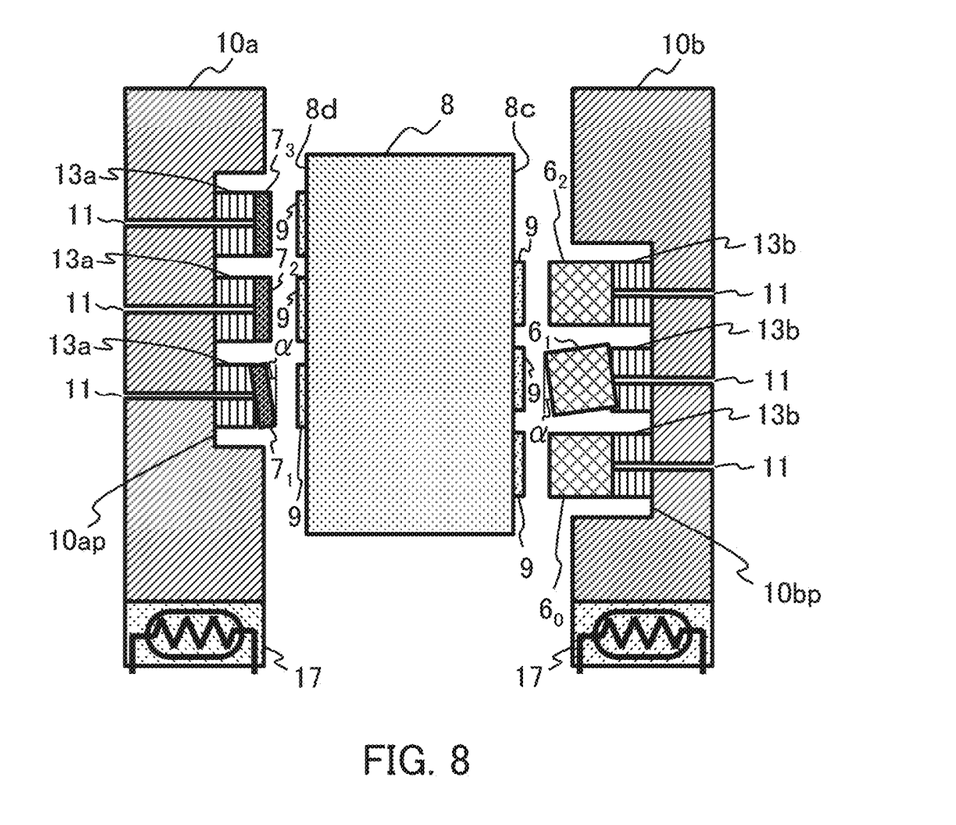
FIG. 8 is a cross section for explaining a method of manufacturing an optical multiplexer/demultiplexer according to Embodiment 2 of the present application.

FIG. 8 is a cross section for explaining a method of manufacturing an optical multiplexer/demultiplexer 3 according to Embodiment 2 of the present application. As shown in FIG. 8, the optical multiplexer/demultiplexer 3 of Embodiment 2 has segmented mirrors $7_k$ (k=1, 2, 3) fixedly bonded to the holder block 8. In the method of manufacturing the optical multiplexer/demultiplexer 3, angle adjusting jigs $13_a$, $13_b$ are provided to the pair of mutually parallel surfaces $10_{ap}$, $10_{bp}$ of the gripping jigs $10_a$, $10_b$, respectively, to finely adjust the holding angles of the optical filters $6_j$ and the mirrors $7_k$. In Step S401 of FIG. 4 showing the process of manufacturing the optical multiplexer/demultiplexer 3, the mirrors $7_1$, $7_2$, $7_3$ and the optical filters $6_0$, $6_1$, $6_2$ are held by vacuum suction through the suction holes 11 to the gripping jigs $10_a$, $10_b$ via the angle adjusting jigs $13_a$, $13_b$ whose holding angles are adjusted in advance to respective predetermined angles. In FIG. 8, the optical filter $6_1$ and the mirror $7_1$ are tilted by an angle α by the corresponding ones of the angle adjusting jigs $13_a$, $13_b$. The configuration and the manufacturing process without the angle adjusting jigs are the same as with Embodiment 1, hence, the descriptions on the same configuration and process are omitted.

Figure 9:
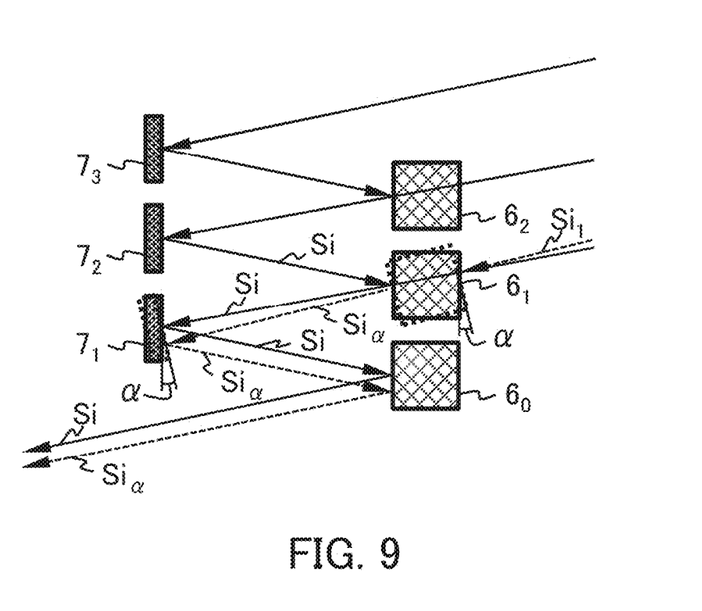
FIG. 9 is a schematic diagram for explaining a method of adjusting the center transmission wavelength of the optical filter of the optical multiplexer/demultiplexer according to Embodiment 2 of the present application.

Employing the method of manufacturing the optical multiplexer/demultiplexer 3 of Embodiment 2 allows the center transmission wavelength of the optical filter to be adjusted by changing the incident angle to the optical filter. FIG. 9 is a schematic diagram for explaining a method of adjusting the center transmission wavelength of one of the optical filters of the optical multiplexer/demultiplexer according to Embodiment 2 of the present application.

In FIG. 9, the solid lines indicates paths of the optical signal beams $S_i$ when the optical filter $6_1$ is not tilted, and the broken line indicates path of an optical signal beam $S_{i\alpha}$ when the optical filter $6_1$ is tilted by an angle $\alpha$. The optical signal beam $S_{i\alpha}$ reflected by the tilted optical filter $6_1$ is angled at 2a with respect to the optical signal beam $S_i$ reflected by the optical filter $6_1$ being not tilted. The optical signal beam $S_1$ having the wavelengths $\lambda_1$ incident on the optical filter $6_1$ needs to be parallel to the optical signal beam $S_{i\alpha}$ reflected by the optical filter $6_1$. Although the reflection angle is changed by $2\alpha$ compared with the case of not tilting the optical filter $6_1$, the change of incident angle is a because the optical filter $6_1$ itself is tilted by $\alpha$.

The opposite mirror $7_1$ is also tilted by the angle of $\alpha$ to cancel out the reflection angle of the tilted optical filter $6_1$. Consequently, the optical signal beam $S_{i\alpha}$ reflected by the tilted mirror $7_1$ becomes parallel to the optical signal beam $S_i$ reflected by the mirror $7_1$ being not tilted. The optical signal beam having the wavelength $\lambda_0$ incident on the optical filter Go is parallel to the optical signal beam $S_{i\alpha}$, i.e., parallel to the optical signal beam $S_i$, which is the same as with the case of not tilting the optical filter. In this way, the incident angle to the optical filter $6_1$ can be independently adjusted alone.

Similarly, the incident angle to the optical filter $6_2$ can be adjusted by changing the angles of the angle adjusting jigs holding the optical filter $6_2$ and the mirror $7_2$ by vacuum suction. In addition, the incident angle to the optical filter $6_0$ can be adjusted by changing only the angle of the angle adjusting jig holding the optical filter $6_0$ by vacuum suction because of no opposite mirror.

In this way, the incident angles to the optical filters can be adjusted by changing the tilt angles of the angle adjusting jigs, whereby an optical filter can also be used that has an off-center transmission wavelength caused by manufacturing variations such as in film thickness of the dielectric multilayer filter formed in the optical filter. This brings about an effect of being able to reduce component costs of the optical filter.

As described above, according to the method of manufacturing the optical multiplexer/demultiplexer 3 of Embodiment 2, the optical filters $6_j$ and the mirrors $7_k$ are respectively held via the angle adjusting jigs to the pair of mutually parallel surfaces $10_{ap}$, $10_{bp}$ of the gripping jigs $10_a$, $10_b$ in the holding step, whereby the incident angles to the optical filters can be adjusted. This allows for using even an optical filter having an off-center transmission wavelength caused by manufacturing variations such as in film thickness of the dielectric multilayer filter formed in the optical filter, thus being able to bring about an effect of reducing component costs of the optical filter as well as the effects of Embodiment 1.

It should be noted that each embodiment may be freely combined or appropriately modified or omitted within the scope of the present application.

REFERENCE NUMERALS

3: optical multiplexer/demultiplexer;
$6_j$: optical filters;
7, $7_k$: mirror(s);
8: holder block;
9: adhesive layers;
10a, 10a: gripping jigs; and
$13_a$, $13_b$: angle adjusting jigs.

The invention claimed is:

1. A method of manufacturing an optical multiplexer/demultiplexer comprising the steps of:
    detachably holding optical filters and a mirror to one surface and another surface of a pair of mutually parallel surfaces of gripping jigs, respectively; and
    gripping, between the gripping jigs holding the optical filters and the mirror, a holder block having parallel surfaces provided with adhesive layers in positions respectively opposite the optical filters and the mirror so that the gaps between the optical filters and the mirror and the parallel surfaces of the holder block are filled with the adhesive layers to reflect the parallelism of the pair of mutually parallel surfaces of the gripping jigs, the optical filters and the mirror being simultaneously pressed with a force such that a degree of parallelism between the optical filters and the mirror is maintained by a thickness of the adhesive layers that fill the gaps.

2. The method of manufacturing an optical multiplexer/demultiplexer according to claim 1, wherein the adhesive layers are formed of a thermoplastic adhesive, and the method further comprising the steps of:
    heating the gripping jigs, with the holder block being gripped; and
    cooling the gripping jigs, with the holder block being gripped.

3. The method of manufacturing an optical multiplexer/demultiplexer according to claim 2, wherein the holder block has a hollow through space formed in a portion for passing optical signal beams between the optical filters and the mirror.

4. The method of manufacturing an optical multiplexer/demultiplexer according to claim 2, wherein the holder block has recesses formed in parts of regions for bonding the optical filters and the mirror.

5. The method of manufacturing an optical multiplexer/demultiplexer according to claim 1, wherein the adhesive layer is composed of an ultraviolet curable adhesive, and the method further comprising the step of
    irradiating the adhesive layer with ultraviolet light, with the holder block being gripped.

6. The method of manufacturing an optical multiplexer/demultiplexer according to claim 5, wherein the holder block has a hollow through space formed in a portion for passing optical signal beams between the optical filters and the mirror.

7. The method of manufacturing an optical multiplexer/demultiplexer according to claim 5, wherein the holder block has recesses formed in parts of regions for bonding the optical filters and the mirror.

8. The method of manufacturing an optical multiplexer/demultiplexer according to claim 1, wherein the holder block has a hollow through space formed in a portion for passing optical signal beams between the optical filters and the mirror.

9. The method of manufacturing an optical multiplexer/demultiplexer according to claim 8, wherein the holder block has recesses formed in parts of regions for bonding the optical filters and the mirror.

10. The method of manufacturing an optical multiplexer/demultiplexer according to claim 1, wherein the holder block has recesses formed in parts of regions for bonding the optical filters and the mirror.

11. A method of manufacturing an optical multiplexer/demultiplexer comprising the steps of:

detachably holding optical filters and a mirror to one surface and another surface of a pair of mutually parallel surfaces of gripping jigs, respectively; and gripping, between the gripping jigs holding the optical filters and the mirror, a holder block having parallel surfaces provided with adhesive layers in positions respectively opposite the optical filters and the mirror so that the gaps between the optical filters and the mirror and the parallel surfaces of the holder block are filled with the adhesive layers to reflect the parallelism of the pair of mutually parallel surfaces of the gripping jigs, wherein the optical filters and the mirror are held to the respective surfaces of the gripping jigs via angle adjusting jigs in the step of gripping the optical filters and the mirror.

12. The method of manufacturing an optical multiplexer/demultiplexer according to claim 11, wherein the adhesive layers are formed of a thermoplastic adhesive, and the method further comprising the steps of:

heating the gripping jigs, with the holder block being gripped; and cooling the gripping jigs, with the holder block being gripped.

13. The method of manufacturing an optical multiplexer/demultiplexer according to claim 12, wherein the holder block has a hollow through space formed in a portion for passing optical signal beams between the optical filters and the mirror.

14. The method of manufacturing an optical multiplexer/demultiplexer according to claim 12, wherein the holder block has recesses formed in parts of regions for bonding the optical filters and the mirror.

15. The method of manufacturing an optical multiplexer/demultiplexer according to claim 11, wherein the adhesive layer is composed of an ultraviolet curable adhesive, and the method further comprising the step of irradiating the adhesive layer with ultraviolet light, with the holder block being gripped.

16. The method of manufacturing an optical multiplexer/demultiplexer according to claim 15, wherein the holder block has a hollow through space formed in a portion for passing optical signal beams between the optical filters and the mirror.

17. The method of manufacturing an optical multiplexer/demultiplexer according to claim 15, wherein the holder block has recesses formed in parts of regions for bonding the optical filters and the mirror.

18. The method of manufacturing an optical multiplexer/demultiplexer according to claim 11, wherein the holder block has a hollow through space formed in a portion for passing optical signal beams between the optical filters and the mirror.

19. The method of manufacturing an optical multiplexer/demultiplexer according to claim 18, wherein the holder block has recesses formed in parts of regions for bonding the optical filters and the mirror.

20. The method of manufacturing an optical multiplexer/demultiplexer according to claim 11, wherein the holder block has recesses formed in parts of regions for bonding the optical filters and the mirror.

* * * * *